(12) United States Patent
Kim et al.

(10) Patent No.: US 12,438,144 B2
(45) Date of Patent: Oct. 7, 2025

(54) ANODE ACTIVE MATERIAL FOR LITHIUM SECONDARY BATTERY, METHOD FOR PREPARING SAME, AND LITHIUM SECONDARY BATTERY COMPRISING SAME

(71) Applicants: POSCO, Pohang-si (KR); RESEARCH INSTITUTE OF INDUSTRIAL SCIENCE & TECHNOLOGY, Pohang-si (KR)

(72) Inventors: Yong Jung Kim, Pohang-si (KR); Seung Jae You, Pohang-si (KR); Eun-Tae Kang, Pohang-si (KR); Jung Gyu Woo, Pohang-si (KR)

(73) Assignee: POSCO HOLDINGS INC., Seoul (KR)

( * ) Notice: Subject to any disclaimer, the term of this patent is extended or adjusted under 35 U.S.C. 154(b) by 780 days.

(21) Appl. No.: 17/298,404

(22) PCT Filed: Aug. 13, 2019

(86) PCT No.: PCT/KR2019/010322
§ 371 (c)(1),
(2) Date: May 28, 2021

(87) PCT Pub. No.: WO2020/111446
PCT Pub. Date: Jun. 4, 2020

(65) Prior Publication Data
US 2021/0408527 A1    Dec. 30, 2021

(30) Foreign Application Priority Data

Nov. 30, 2018    (KR) .................... 10-2018-0152144

(51) Int. Cl.
*H01M 4/36*     (2006.01)
*C01B 32/21*    (2017.01)
(Continued)

(52) U.S. Cl.
CPC ............. *H01M 4/362* (2013.01); *C01B 32/21* (2017.08); *C01B 33/02* (2013.01);
(Continued)

(58) Field of Classification Search
CPC .. H01M 4/362; H01M 4/0433; H01M 4/0471; H01M 4/133; H01M 4/134;
(Continued)

(56) References Cited

U.S. PATENT DOCUMENTS

| | | | |
|---|---|---|---|
| 2013/0209881 A1* | 8/2013 | Do ................... | H01M 4/366 429/231.9 |
| 2018/0097229 A1* | 4/2018 | Jo .................... | H01M 4/364 |
| 2018/0205075 A1* | 7/2018 | Wakizaka .......... | H01M 4/133 |

FOREIGN PATENT DOCUMENTS

| | | | |
|---|---|---|---|
| CN | 103618073 A | | 3/2014 |
| CN | 103682287 | * | 3/2014 |

(Continued)

OTHER PUBLICATIONS

N. Liu, et al., "A Yolk-Shell Design for Stabilized and Scalable Li-Ion Battery Alloy Anodes," American Chemical Society, ACS Publications, Nano Letters, Apr. 20, 2012, pp. 1-7.
(Continued)

*Primary Examiner* — Matthew W Van Oudenaren
(74) *Attorney, Agent, or Firm* — Morgan Lewis & Bockius LLP

(57) ABSTRACT

An embodiment of the present invention provides an anode active material for a lithium secondary battery, which is a porous silicon-carbon composite including a plurality of nano-silicon particles embedded in a carbon-based material and having a plurality of pores, wherein the carbon-based material includes graphite particles, soft carbon, hard carbon, or a combination thereof, and based on 100 wt % of the porous silicon-carbon composite, a weight ratio of the (Continued)

graphite particles to the soft carbon, the hard carbon, or a combination thereof is 1:5 to 5:1.

11 Claims, 7 Drawing Sheets

(51) Int. Cl.
| | |
|---|---|
| C01B 33/02 | (2006.01) |
| H01M 4/02 | (2006.01) |
| H01M 4/04 | (2006.01) |
| H01M 4/133 | (2010.01) |
| H01M 4/134 | (2010.01) |
| H01M 4/38 | (2006.01) |
| H01M 4/587 | (2010.01) |
| H01M 10/0525 | (2010.01) |

(52) U.S. Cl.
CPC ....... *H01M 4/0433* (2013.01); *H01M 4/0471* (2013.01); *H01M 4/133* (2013.01); *H01M 4/134* (2013.01); *H01M 4/386* (2013.01); *H01M 4/587* (2013.01); *H01M 10/0525* (2013.01); *H01M 2004/027* (2013.01)

(58) Field of Classification Search
CPC .... H01M 4/386; H01M 4/587; H01M 4/1393; H01M 4/1395; H01M 4/364; H01M 4/366; H01M 4/62; H01M 4/625; H01M 4/043; H01M 4/622; H01M 4/621; H01M 10/0525; H01M 10/052; H01M 2004/027; H01M 2004/021
See application file for complete search history.

(56) References Cited

FOREIGN PATENT DOCUMENTS

| CN | 105720258 A | 6/2016 |
|---|---|---|
| CN | 106233511 A | 12/2016 |
| CN | 107785560 A | 3/2018 |
| EP | 3133678 A1 | 2/2017 |
| JP | 2012-019622 A | 1/2012 |
| JP | 2013-179033 A | 9/2013 |
| JP | 2016-066585 A | 4/2016 |
| JP | 2018-029049 A | 2/2018 |
| JP | 2018-170246 A | 11/2018 |
| KR | 10-0794192 B1 | 1/2008 |
| KR | 10-2011-0029087 A | 3/2011 |
| KR | 10-2013-0075339 A | 7/2013 |
| KR | 10-2014-0082036 A | 7/2014 |
| KR | 10-2016-0078720 A | 7/2016 |
| KR | 10-2016-0088181 A | 7/2016 |
| KR | 10-2016-0089858 A | 7/2016 |
| KR | 20160078720 * | 7/2016 |
| KR | 10-2016-0147672 A | 12/2016 |
| KR | 10-2017-0030974 A | 3/2017 |
| KR | 10-2017-0037461 A | 4/2017 |
| KR | 6113123 B2 | 4/2017 |
| KR | 10-2017-0074030 A | 6/2017 |
| KR | 10-2017-0104035 A | 9/2017 |
| KR | 10-2017-0117392 A | 10/2017 |
| KR | 10-2018-0036456 A | 4/2018 |
| KR | 10-2018-0070302 A | 6/2018 |
| KR | 10-2018-0072274 A | 6/2018 |
| KR | 10-2020-0036622 A | 4/2020 |

OTHER PUBLICATIONS

Z. Favors, et al., "Stable Cycling of SiO2 Nanotubes as High-Performance Anodes for Lithium-Ion Batteries," Scientific Reports, Published Apr. 15, 2014, pp. 1-7.
Extended European Search Report dated Feb. 2, 2022 issued in European Patent Application No. 19889296.0.
Chinese Office Action dated Dec. 12, 2023 issued in Chinese Patent Application No. 201980079152.6.
Written Opinion and International Search Report dated Nov. 28, 2019 issued in International Patent Application No. PCT/KR2019/010322 (with English translation).
X. Li, et a., "Mesoporous silicon sponge as an anti-pulverization structure for high-performance lithium-ion battery anodes," Nature Communications, Jul. 8, 2014, No. 5, pp. 4105-4111.
H. Wu, et al., "Stable Li-ion battery anodes by in-situ polymerization of conducting hydrogel to conformally coat silicon nanoparticles," Nature Communications, Jun. 4, 2013, No. 4, pp. 1943-1948.
M. Gu, et al., "In Situ TEM Study of Lithiation Behavior of Silicon Nanoparticles Attached to and Embedded in a Carbon Matrix," ASC Nano, 2012, vol. 6, No. 9, pp. 8439-8447.
N. Liu, et al., "A pomegranate-inspired nanoscale design for large-vol. change lithium battery anodes," Mar. 2014, vol. 9, pp. 187-192.
V. Chevrier, et al., "Evaluating Si-Based Materials for Li-Ion Batteries in Commerically Relevant Negative Electrodes," Journal of the Electrochemical Society, vol. 161, No. 5, 2014, pp. A783-A791.
X. Liu, et al., "Size-Dependent Fracture of Silicon Nanoparticles During Lithiation," ASC Nano, 2012, vol. 6, p. 1522-1531.
Chinese Notice of Allowance dated Sep. 6, 2024 issued in Chinese Patent Application No. 201980079152.6 (with English translation).

* cited by examiner (a) Comparative Example A1

(b) Example A1

(a)

(b)

(a)

(b)

(a)

(b)

ANODE ACTIVE MATERIAL FOR LITHIUM SECONDARY BATTERY, METHOD FOR PREPARING SAME, AND LITHIUM SECONDARY BATTERY COMPRISING SAME

CROSS-REFERENCE OF RELATED APPLICATIONS

This application is the U.S. National Phase under 35 U.S.C. § 371 of International Patent Application No. PCT/KR2019/010322, filed on Aug. 13, 2019, which in turn claims the benefit of Korean Application Nos. 10-2018-0152144, filed on Nov. 30, 2018, the entire disclosures of which applications are incorporated by reference herein.

TECHNICAL FIELD

An anode active material for a lithium secondary battery, a method for preparing the same, and a lithium secondary battery including the same are disclosed.

BACKGROUND ART

Lithium ion secondary batteries (LIB) are suggested as an alternative driving energy source for electric vehicles to internal combustion engines using fossil fuels in the midst of a required capacity increase according to high performance of portable home appliances and mobile phones and an environmental issue and thus being a lot researched and invested as the most powerful and efficient driving energy system.

The lithium ion secondary batteries (LIB) are composed of a cathode material, an anode material, a separation membrane, and an electrolyte, which are closely related to one another and have an influence on performance and behavior of the batteries. Among them, as for the anode active material, hard/soft carbon or graphite-based materials, which are carbon allotropes, have been used for nearly 30 years from 1991 when LIB was developed.

Presently, graphite, which is widely used as the anode material for the lithium ion secondary batteries, has advantages in terms of a low working voltage, stable cycle-life characteristics, efficiency, a price, and environmentally-friendliness. However, the graphite has a theoretical capacity limited to a maximum of 372 mAh/g and thus problems to be overcome in securing mileages of the electric vehicles and in various applications.

In order to overcome the limited capacity of the graphite, various elemental oxide-based materials ($Fe_3O_4$; 924 mAh/g, FeO; 744 mAh/g, $Co_3O_4$, 890 mAh/g, NiO, 718 mA/g, $SnO_2$; 781 mAh/g, and the like) and Group 4 element-based materials representatively including Si (Si; 4200 mAh/g, Sn; 994 mAh/g, Ge; 1600 mAh/g) are considered as next-generation materials, and accordingly, Si is the most actively studied for development of high-capacity electrodes.

Theoretically, silicon-based anode materials are known to have more than 10 times higher capacity than commercially available graphite-based anode materials. However, the silicon anode materials have problems of accompanying a volume change of about 4 times and even breakage of particles or peeling of electrodes according to repeatedly charges and discharges and thus rapidly deteriorating battery performance, which has been an obstacle to the commercialization.

Herein, during the intercalation of lithium ions, a solid electrolyte interphase (SEI) layer is formed on the surface of Si by electrolyte salts with solutions and then, cracked due to the contraction/expansion of the electrodes and newly exposed but reformed on the newly-exposed surface, and this repeated phenomenon may increase a diffusion path of the Li ions, increasingly consume an electrolyte solution, and deteriorate conductivity and coulombic efficiency, eventually resulting in making the batteries unusable.

DISCLOSURE

An embodiment of the present invention is to provide a Si-based anode active material including secondary particles densified to suppress formation of SEI by minimizing a specific surface area of primary particles. Specifically, in order to reduce a carbonization yield change of pitch, it is to provide an anode active material for a lithium secondary battery in which a weight range of the pitch, a temperature-increasing condition of the secondary particles, a co-carbonization effect with petroleum-based pitch, and the like are controlled.

Accordingly, it is possible to provide an anode active material for a lithium secondary battery in which the carbonization yield is increased and the specific surface area is reduced.

Hereinafter, embodiments of the present invention are described in detail. However, these embodiments are exemplary, the present invention is not limited thereto and the present invention is defined by the scope of claims.

An anode active material for a lithium secondary battery according to an embodiment of the present invention is a composite material which includes a plurality of nano-silicon particles embedded in a carbon-based material and has a minimized specific surface area through compression under high pressure wherein the carbon-based material includes graphite particles, soft carbon, hard carbon, or a combination thereof.

First, in the porous silicon-carbon composite includes a plurality of nano-silicon particles embedded in a carbon-based material, and has a form in which pore formation is minimized by a high-pressure molding process.

This corresponds to a form capable of maintaining electrical contact with internal constituent materials because it is embedded by a carbon-based material even if the volume of the plurality of nano-silicon particles is expanded or contracted.

In addition, the high-density composite by the pressurization process controls the volume expansion during charge and minimizes the short circuit during discharge. Such a composite may realize stable electrochemical performance by the type and amount of silicon to be injected, the type of binder pitch that maintains the network with graphite, and adhesion performance.

The nano-silicon particles may be particles controlled to a nano-level by irradiating a carbon dioxide laser to a silane gas. Specifically, the acetylene gas may be pyrolyzed at a high temperature and then deposited on the surface of the nano-silicon particles to form nano-silicon particles having a carbon coating layer.

In addition, the nano-silicon particles may be nano-silicon particles that do not require a separate pulverizing process because they are synthesized by a dry method including thermal evaporation, chemical vapor deposition (CVD), physical vapor deposition (PVD), electromagnetic melting, and simultaneous volatilization. Specifically, the average particle diameter (D50) of the nano-silicon particles may have a range of 30 nm to 100 nm, and desirably 40 nm to 50 nm.

Herein, the carbon-based material may be graphite particles, soft carbon, hard carbon, or a combination thereof.

Specifically, when graphite particles are included, long-term cycle-life characteristics may be supplemented with excellent reversibility of graphite. In addition, the particle diameter (D50) of the graphite may be 10 μm to 40 μm.

The soft carbon may be originated from pitch. Accordingly, in the case of using a pitch, structural stability may be enhanced after carbonization through heat-treatment.

The hard carbon may be originated from a binder used in a method of preparing an anode active material for a lithium secondary battery to be described later.

Specifically, based on 100 wt % of the porous silicon-carbon composite, a weight ratio of the graphite particles to the soft carbon, the hard carbon, or a combination thereof may be 1:5 to 5:1.

More specifically, as the weight ratio of the carbon-based material is within the above range, the specific surface area of the nano-silicon-carbon composite may be less than or equal to 20 m$^2$/g. Specifically, it may be less than or equal to 10 m$^2$/g. More specifically, it may be less than or equal to 5 m$^2$/g.

More specifically, when the weight including the soft carbon originated from the pitch is greater than that of graphite as described above, the specific surface area of the anode active material may be reduced.

Based on 100 wt % of the porous silicon-carbon composite, 30 wt % to 40 wt % of nano-silicon, and 60 wt % to 70 wt % of the carbon-based particle may be included.

When the content of the nano-silicon satisfies the above range, excellent capacity characteristics may be secured and the volume expansion of the electrode due to the progress of charging and discharging with respect to the battery including the anode active material of the present embodiment may be suppressed.

In addition, the average particle diameter (D50) of the nano-silicon particles may be 30 to 100 nm.

In this way, silicon particles having an average particle diameter refined to a nano-size may minimize volume expansion due to charging and discharging of a battery.

The binder material used to form the porous silicon-carbon composite is carbonized to become hard carbon. Such hard carbon may degrade the properties of the silicon-carbon composite, and in order to prevent this, a polymer material having a residual carbon amount in the range of 5% to 10% after carbonization through heat-treatment is suitable.

In addition, the pitch is carbonized to become the above-described soft carbon. Pitch may also function as a binder stably supporting the silicon/carbon composite structure. Accordingly, the hard carbon and soft carbon are dispersed and positioned between the pores of the porous silicon-carbon composite, so that when the anode active material according to an embodiment of the present invention is applied to a battery, even if charging and discharging cycles are repeated, the porous structure of the silicon-carbon composite may be prevented from collapsing.

Based on the total volume (100 volume %) of the anode active material, the volume of pores may be less than or equal to 3 volume %. Specifically, it may be 1 volume to 3 volumes.

When the porosity of the anode active material satisfies the above range, volume expansion of silicon may be effectively alleviated. The D50 particle diameter of the anode active material may be 8 μm to 15 μm.

When the D50 particle diameter of the anode active material exceeds the above range, particle damage may occur due to the compression roll during electrode compressing after coating, which may lead to deterioration of overall performance, such as battery efficiency, cycle-life, and electrode expansion rate.

In addition, a carbon coating layer may be disposed on the surface of the anode active material.

Specifically, based on 100 wt % of the anode active material, the deposition amount of the carbon coating layer may be 3 wt % to 15 wt %.

When the carbon coating layer is further disposed on the surface of the anode active material as described above, the specific surface area of the anode active material may be further reduced.

A method of preparing an anode active material for a lithium secondary battery according to another embodiment of the present invention includes preparing a porous silicon-carbon mixed powder by mixing nano-silicon particles, graphite particles, and pitch particles by dry milling, adding the porous silicon-carbon mixed powder and a binder to distilled water to prepare a mixed solution, spray-drying the mixed solution to prepare primary particles, inserting the primary particles into a mold and press-molding to produce secondary particles, heat-treating the secondary particles, and pulverizing and sieving the heat-treated secondary particles.

First, the process of preparing a porous silicon-carbon mixed powder by mixing nano-silicon particles, graphite particles, and pitch particles by dry milling may be performed.

In this case, descriptions of the nano-silicon particles are omitted because they are the same as described above in the anode active material for a lithium secondary battery.

In the process of preparing the porous silicon-carbon mixed powder, the pitch particles may be included in an amount of greater than or equal to 30 wt % based on 100 wt % of the porous silicon-carbon mixed powder.

Specifically, based on 100 wt % of the porous silicon-carbon mixed powder, 30 wt % to 40 wt % of the nano-silicon particles, 10 wt % to 30 wt % of the graphite particles, and 30 wt % to 50 wt % of the pitch may be included.

In this case, the weight of the pitch may be greater than or equal to the weight of the graphite.

Specifically, a weight ratio of the pitch and the graphite may be 1:1 to 5:1.

When preparing a mixed powder by mixing pitch and graphite in the above-described weight range, the carbonization yield increases even after the subsequent heat-treatment, thereby reducing the specific surface area of the prepared anode active material. For this reason, an anode active material having a high tap density may be provided.

More specifically, the pitch may include a coal-based pitch, a petroleum-based pitch, or a combination thereof.

Specifically, when the coal-based pitch is combined with the petroleum-based pitch, the weight of the coal-based pitch may be greater than or equal to the weight of the petroleum-based pitch.

More specifically, the weight ratio of the coal-based pitch:the petroleum-based pitch may be in the range of 5:5 to 9:1 based on 100 wt % of the pitch.

When using a coal-based pitch as described above, coking and yield may be high. The petroleum-based pitch have high fluidity when compared based on the structure of the same softening point, so that the penetration into the pores may be improved, but there is a high possibility of making defects in terms of coking and yield. Accordingly, when the coal-based pitch is mixed with the petroleum-based pitch by the weight described above, an anode active material having excellent carbonization yield may be obtained even after the subsequent heat-treatment.

In addition, it is preferable that the pitch has a fixed carbon and a coking value as high as possible. However, if the softening point of the pitch becomes excessively high, a pitch unit price may be increased and processibility may be adversely affected, and thus it is important to select an appropriate softening point and yield.

The pitch may have a fixed carbon value of greater than or equal to 70.

As the fixed carbon value of the pitch is increased, Si having low self-conductivity and conductive paths are generated, thereby inducing an increase in capacity and efficiency. When the fixed carbon value satisfies the range, inner porosity of the anode active material of the present example embodiment may be reduced. Accordingly, a side reaction with the electrolyte may also be reduced, resultantly contributing to increasing initial efficiency of a battery.

The pitch may have a beta-resin (β-resin) value of greater than or equal to 20. Specifically, the β-resin value refers to a value excluding a quinoline-insoluble amount from a benzene-insoluble amount. This beta-resin value is proportional to coking. In one embodiment of the present invention, since pitch satisfying the range of the β-resin value is included, the porous structure of the porous silicon-carbon composite may be more stably maintained. Accordingly, a lithium secondary battery having excellent cycle-life characteristics and electrode plate expansion characteristics may be realized.

In addition, the pitch may be finely pulverized to a level of several micrometers and then applied.

In addition, the used graphite has a purity of a battery grade and may be used in the preparation of primary particles by controlling a particle size of several micrometers to several tens of micrometers.

Specifically, after mixing the graphite particles, pitch particles, and nano-silicon particles through the dry milling, the nano-silicon particles may maintain an electrical contact with other materials despite volume expansion and contraction according to the cycling when this anode active material is applied to a battery. Specifically, the graphite particles and pitch particles may control the expansion of the nano-silicon particles.

In addition, the milling process may use a mechano fusion or a ball mill process. However, the milling process is not limited thereto but may include any process through a contact with powder.

Thereafter, the porous silicon-carbon-based mixed powder and a binder may be added to distilled water to prepare a mixed solution.

Herein, the binder may include an organic binder, an aqueous binder, or a combination thereof. Specifically, the binder may be an aqueous binder.

If the aqueous binder is used, a facility investment may be less and the process may be simpler.

Specifically, the aqueous binder may include at least one selected from polyacrylic acid (PAA), arabic gum, polyvinyl alcohol (PVA), polyethylene glycol (PEG), Pluronic® (F-127), and a cellulose-based compound.

Specifically, according to an embodiment of the present invention, as the aqueous binder is used, aqueous slurry may be used.

Herein, based on 100 parts by weight of the porous silicon-carbon mixed powder, the binder may be included in an amount of less than or equal to 15 parts by weight.

Specifically, when the content of the binder is within the above range, dispersion of the porous silicon-carbon mixed powder and the pitch in the mixed solution may be activated.

As will be described later, the binder becomes hard carbon after the heat-treatment.

Specifically, after the mixed powder and the binder are added to distilled water, a well-dispersed colloidal mixed solution may be prepared by ultrasonic waves for 1 hour or more.

On the other hand, if a solvent such as ethanol, isopropyl alcohol (IPA), acetone, and the like, rather than distilled water is applied as the solvent of the mixed solution, the binding force between the nano-silicon particles, graphite particles, and pitch particles may be lowered, thereby reducing the performance of the battery including the same.

By spray-drying the mixed solution, the primary particles may be prepared.

Specifically, spherical primary particles may be prepared by spray-drying the mixed solution prepared above with a spray device.

Specifically, if the spray-drying process is not performed, there may be a limit to uniformly dispersing the nano-silicon particles, graphite particles, and pitch particles.

In other words, the dry milling process alone may not achieve as much dispersion effects as the spray drying process. When the dispersion effect is deteriorated due to this, side effects such as cycle-life deterioration and severe expansion, and the like may occur when measuring electrochemical performance of a battery.

The primary particles may be inserted into a mold and subjected to press-molding to produce secondary particles.

In the case of preparing the secondary particles by press-molding as described above, high density may be obtained.

Specifically, the preparing of the secondary particles may be performed at a temperature range of 50° C. to 100° C. or higher than the softening point of the pitch.

The softening point of the pitch used in an embodiment of the present invention may be greater than or equal to 250° C.

Accordingly, when the press-molding is performed within the temperature range, the above pores inside the porous silicon-carbon-based material may be minimized.

Specifically, when the temperature range during the press-molding is controlled to be 50° C. to 100° C. higher than the softening point of the pitch, the pitch may have viscosity and fill the pores in the porous silicon-carbon-based material. Since the pores in the composite provide side reaction sites with the electrolyte when applied to a battery and deteriorate electrochemical performance, electrochemical properties may be improved by controlling the temperature within the temperature range.

In addition, a pressure of 100 tons to 200 tons for 5 minutes to 1 hour is applied to prepare secondary particles. When the pressure is applied within the range, the binding force between the nano-silicon particles, graphite particles, and pitch particles may be additionally further increased.

The secondary particles are heat-treated.

Herein, the heat-treatment may be performed at 700° C. to 1000° C. under an inert atmosphere. During the heat-treatment, the secondary particles may be carbonized.

Specifically, the heat-treatment under the above conditions is to prevent oxidation of Si and apply high temperature viscosity characteristics to the pitch to increase the binding force.

As described above, by the above processes, the pitch and the binder may be carbonized into soft carbon and hard carbon, respectively.

More specifically, the heat-treating of the secondary particles may include a first isothermal process in which the secondary particles are heated up to a temperature of 50° C. to 350° C. higher than the softening point of the pitch and maintained at a rate of less than or equal to 7° C./min, and a second isothermal process in which after the first isothermal process, they are heated up to a temperature range of 700° C. to 1000° C. at a rate of less than or equal to 7° C./min and then maintained.

Specifically, the first isothermal process and the second isothermal process may be performed at less than or equal to 5° C./min.

In addition, the first isothermal process may be performed for 1 hour to 4 hours.

On the other hand, the second isothermal process may be performed for 1 hour to 4 hours.

Herein, as described above, a softening point of the pitch used in one embodiment of the present invention may be greater than or equal to 250° C.

Specifically, the first isothermal process is performed by increasing a temperature up to 50° C. to 350° C. higher than the softening temperature of the pitch and then, maintaining it for predetermined time, slowly removing low molecular weight volatiles decomposable at a high temperature. Alternatively, a process of inducing a condensation reaction may play an important role in improving the carbonization yield of the anode active material.

Specifically, when the first isothermal process is performed by slowly increasing a temperature up to the temperature range, a carbonization yield of the obtained anode active material may be more improved.

In addition, the carbonization yield may be further improved by further performing the second isothermal process of slowly increasing the temperature to the temperature range of 700° C. to 1000° C. at 7° C./min or less and maintaining it after the first isothermal process.

After the heat-treatment of the secondary particles, the carbonization yield of the secondary particles may be in a range of 60% to 95%. Specifically, the carbonization yield may be 80% to 95%.

Hereinafter, in the present specification, the "carbonization yield" means a result of dividing a weight of carbon obtained after the heat-treatment by a weight of the carbon before the heat-treatment and converting it into a percentage.

Specifically, the nano-silicon particles and the graphite particles included in the primary particles exhibit almost no weight changes after the heat-treatment. On the other hand, the pitch may undergo rapid changes in a structure and a shape by the heat-treatment. Accordingly, a largest yield change may be exhibited.

Specifically, when the pitch has a large weight change by the heat-treatment, the carbonization yield is reduced, and thereby, pores inside the secondary particles may be formed, increasing the specific surface area (BET).

Accordingly, the anode active material according to one embodiment of the present invention may have an excellent carbonization yield after the heat-treatment. This is the result of controlling all of the aforementioned conditions.

The heat-treated secondary particles are pulverized and sieved.

Specifically, the heat-treated secondary particles may be pulverized using a jet mill, a pin mill, or a combination thereof.

After pulverizing, sieving may be performed to obtain an anode active material having an average particle diameter (D50) of 8 μm to 15 μm.

After pulverizing and sieving the heat-treated secondary particles, forming a carbon coating layer on the surfaces of the secondary particles may be further performed.

Specifically, the carbon coating layer may be formed at 750° C. to 1000° C. for 30 minutes to 2 hours in a CVD deposition method. More specifically, the carbon coating layer may be formed by using inert gas and hydrocarbon gas in the CVD deposition method. Specifically, when the temperature of the heat-treatment is too high, there may be a risk of oxidating Si, but when the temperature is too low, the coating layer may not be easy to form.

In addition, the coating layer may be formed on the secondary particle surfaces under an atmosphere including argon gas and hydrocarbon gas in the CVD deposition method.

More specifically, a deposition amount of the carbon coating layer formed on the secondary particle surfaces in the above process may be 3 wt % to 15 wt % based on 100 wt % of a total amount of the secondary particles. When the carbon coating layer is formed the above conditions, the carbon coating layer with the deposition amount may be formed.

In addition, the secondary particles having the coating layer formed thereon may have a further reduced specific surface area.

The aforementioned anode active material may be usefully used for an anode of a lithium secondary battery.

That is, a lithium secondary battery according to an embodiment includes an anode including the aforementioned anode active material and an electrolyte together with a cathode.

A lithium secondary battery according to an embodiment may include an electrode assembly including a cathode, an anode, and a separator disposed between the cathode and anode. Such an electrode assembly may be wound or folded and accommodated in a case to constitute a lithium secondary battery.

Herein, the case may have a shape such as a cylindrical shape, a square shape, and a thin film type, and may be appropriately modified according to the type of device to be applied.

The anode may be manufactured by mixing an anode active material, a binder, and optionally a conductive material to prepare a composition for forming an anode active material layer, and then coating the composition on an anode current collector.

The anode current collector may be, for example, a copper foil, a nickel foil, a stainless steel foil, a titanium foil, a nickel foam, a copper foam, a polymer substrate coated with a conductive metal, or a combination thereof.

The anode active material may include a porous silicon-carbon composite including a plurality of nano-silicon particles embedded in a carbon-based material and having a plurality of pores as described in an embodiment. Detailed descriptions of each configuration are the same as those described above, and will be omitted here.

The binder may include polyvinyl alcohol, a carboxymethylcellulose/styrene-butadiene rubber, hydroxypropylene cellulose, diacetylene cellulose, polyvinyl chloride, polyvinylpyrrolidone, polytetrafluoroethylene, polyvinylidene fluoride, polyethylene, or polypropylene or the like, but is not limited thereto. The binder may be mixed in an amount of 1 wt % to 30 wt % based on a total amount of the composition for forming the anode active material layer.

The conductive material may be anyone having conductivity while not causing chemical changes in a battery without particular limitation. Specifically the conductive material may include natural graphite, artificial graphite, and the like graphite; carbon black such as acetylene black, ketjen black, channel black, furnace black, lamp black, thermal black, and the like; a conductive fiber such as a carbon fiber, a metal fiber, and the like; carbon fluoride; a metal powder such as aluminum, nickel powder, and the like; a conductive whisker such as zinc oxide, potassium titanate, and the like; a conductive metal oxide such as titanium oxide and the like; and a conductive material such as a polyphenylene derivative and the like. The conductive material may be included in an amount of 0.1 wt % to 30 wt % based on a total amount of the composition for forming an anode active material layer.

Next, the cathode may be manufactured by mixing a cathode active material, a binder, and optionally a conductive material to prepare a composition for forming a cathode active material layer, and then coating the composition to a cathode current collector. Herein, the binder and the conductive material are used in the same manner as in the case of the aforementioned anode.

The cathode current collector may be, for example, stainless steel, aluminum, nickel, titanium, sintered carbon, or aluminum or stainless steel surface-treated with carbon, nickel, titanium, silver, or the like.

The cathode active material may be a compound (lithiated intercalation compound) capable of intercalating and deintercallating lithium.

Specifically, the cathode active material may be at least one composite oxide of lithium and a metal of cobalt, manganese, nickel, or a combination thereof, and specific examples thereof may be a compound represented by one of chemical formulas. $Li_aA_{1-b}R_bD_2$ (wherein, in the above chemical formula, $0.90 \leq a \leq 1.8$ and $0 \leq b \leq 0.5$); $Li_aE_{1-b}R_bO_{2-c}D_c$ (wherein, in the above chemical formula, $0.90 \leq a \leq 1.8$, $0 \leq b \leq 0.5$, and $0 \leq c \leq 0.05$); $Li_{2-b}R_bO_{4-c}D_c$ (wherein, in the above chemical formula, $0 \leq b \leq 0.5$, $0 \leq c \leq 0.05$); $Li_aNi_{1-b-c}Co_bR_cD_\alpha$ (wherein, in the above chemical formula, $0.90 \leq a \leq 1.8$, $0 \leq b \leq 0.5$, $0 \leq c \leq 0.05$ and $0 < \alpha \leq 2$); $Li_aNi_{1-b-c}Co_bR_cO_{2-\alpha}Z_\alpha$ (wherein, in the above chemical formula, $0.90 \leq a \leq 1.8$, $0 \leq b \leq 0.5$, $0 \leq c \leq 0.05$ and $0 < \alpha < 2$); $Li_aNi_{1-b-c}Co_bR_cO_{2-\alpha}Z_2$ (wherein, in the above chemical formula, $0.90 \leq a \leq 1.8$, $0 \leq b \leq 0.5$, $0 \leq c \leq 0.05$ and $0 < \alpha < 2$); $Li_aNi_{1-b-c}Mn_bR_cD_\alpha$ (wherein, in the above chemical formula, $0.90 \leq a \leq 1.8$, $0 \leq b \leq 0.5$, $0 \leq c \leq 0.05$ and $0 < \alpha \leq 2$); $Li_aNi_{1-b-c}Mn_bR_cO_{2-\alpha}Z_\alpha$ (wherein, in the above chemical formula, $0.90 \leq a \leq 1.8$, $0 \leq b \leq 0.5$, $0 \leq c \leq 0.05$ and $0 < \alpha < 2$); $Li_aNi_{1-b-c}Mn_bR_cO_{2-\alpha}Z_2$ (wherein, in the above chemical formula, $0.90 \leq a \leq 1.8$, $0 \leq b \leq 0.5$, $0 \leq c \leq 0.05$ and $0 < \alpha < 2$); $Li_aNi_bE_cG_dO_2$ (wherein, in the above chemical formula, $0.90 \leq a \leq 1.8$, $0 \leq b \leq 0.9$, $0 \leq c \leq 0.5$ and $0.001 \leq d \leq 0.1$); $Li_aNi_bCo_cMn_dGeO_2$ (wherein, in the above chemical formula, $0.90 \leq a \leq 1.8$, $0 \leq b \leq 0.9$, $0 \leq c \leq 0.5$, $0 \leq d \leq 0.5$ and $0.001 \leq e \leq 0.1$); $Li_aNiG_bO_2$ (wherein, in the above chemical formula, $0.90 \leq a \leq 1.8$ and $0.001 \leq b \leq 0.1$); $Li_aCoG_bO_2$ (wherein, in the above chemical formula, $0.90 \leq a \leq 1.8$ and $0.001 \leq b \leq 0.1$); $Li_aMnG_bO_2$ (wherein, in the above chemical formula, $0.90 \leq a \leq 1.8$ and $0.001 \leq b \leq 0.1$); $Li_aMn_2GbO_4$ (wherein, in the above chemical formula, $0.90 \leq a \leq 1.8$ and $0.001 \leq b \leq 0.1$); $QO_2$, $QS_2$; $LiQS_2$; $V_2O_5$, $LiV_2O_5$; $LiTO_2$; $LiNiVO_4$, $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above chemical formulas, A is Ni, Co, Mn, or a combination thereof; R is Al, Ni, Co, Mn, Cr, Fe, Mg, Sr, V, a rare earth element, or a combination thereof; D is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

The electrolyte for filling the lithium secondary battery may include a non-aqueous electrolyte or a commonly-known solid electrolyte, in which a lithium salt is dissolved.

The lithium salt may include, for example, at least one selected from $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiCl$, and $LiI$.

The solvent of the non-aqueous electrolyte may include, for example, a cyclic carbonate dimethyl carbonate such as ethylene carbonate, propylene carbonate, butylenes carbonate, vinylene carbonate, and the like; a linear carbonate such as methylethyl carbonate, diethyl carbonate, and the like; ester series such as methyl acetate, ethyl acetate, propyl acetate, methyl propionate, ethyl propionate, γ-butyrolactone, and the like; ether series such as 1,2-dimethoxyethane, 1,2-diethoxyethane, tetrahydrofuran, 1,2-dioxane, 2-methyltetrahydrofuran, and the like; nitrile series such as acetonitrile and the like; amide series such as dimethylformamide; and the like, but is not limited thereto. These may be used alone or in a combination. In particular, cyclic carbonate and linear carbonate can be used as a mixed solvent.

The electrolyte may include a gel-type polymer electrolyte prepared by impregnating an electrolyte solution in a polymer electrolyte such as polyethylene oxide, polyacrylonitrile, and the like or an inorganic solid electrolyte such as $LiI$, $Li_3N$, and the like.

The separator may be an olefin-based polymer such as polypropylene having chemical resistance and hydrophobicity; sheets or non-woven fabrics made of glass fiber, polyethylene, or the like. When a solid electrolyte such as a polymer is used as the electrolyte, the solid electrolyte may also serve as a separator.

The primary particles include Si nano particles in which hard carbon originated from the pitch is well dispersed with pores and thus may have a tightly-holding structure to prevent a short circuit with the carbon material despite expansion/contraction during the charge and discharge. In addition, the pitch may maintain a binding force with the graphite particles and thus maintain an electrical network with the graphite particles.

In addition, the primary particles may be pressed to reduce porosity in the particles and also to minimize a short circuit due to a strong binding force of the 3 components of the nano-silicon particles-pitch particles-graphite particles despite the repeated charges and discharges. Herein, the specific surface area is minimized, thereby minimizing a capacity loss due to the SEI and also minimizing a surface area of newly exposed SEI to prevent a continuous increase of SEI.

DESCRIPTION OF THE DRAWINGS

Mode for Invention

Figure 1:
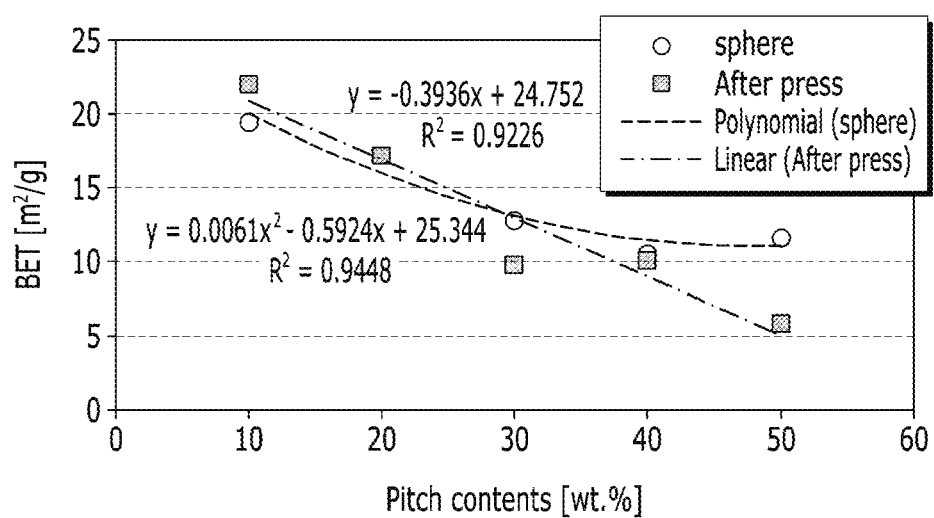
FIG. 1 is a graph showing a correlation between a pitch content and a specific surface area (BET).

Hereinafter, specific examples of the present invention will be described. However, the following examples are only specific examples of the present invention, and the present invention is not limited to the following examples.

Example A: Comparison of Characteristics Depending on Pitch Content

Example A1

(1) Preparation of Anode Active Material

Nano-silicon particles, graphite particles, and pitch particles were milled under a dry condition for 1 hour to prepare mixed powder. In the mixed powder, a weight ratio of the nano-silicon particles:the graphite particles:the pitch particles was 4:1:5.

Herein, the used pitch was coal-based pitch, and a softening point of the pitch was 250° C.

Subsequently, the mixed powder and an aqueous binder (Gum Arabic) were added to distilled water and then, well dispersed with a magnetic stirrer, and when well dispersed, the dispersion was further dispersed by using a horn-type ultrasonic wave for 1 hour, preparing a mixed solution.

Herein, in 100 wt % of the mixed solution, the mixed powder was included at a concentration of 3% to 20%.

Subsequently, the mixed solution was put in an atomizer 20,000 r.p.m at 50 mL/min for spray-drying, preparing primary particles.

Then, the primary particle powder was charged into a mold to prepare secondary particles by using a uniaxial pressure molding machine. Specifically, the primary particle powder was pressed at a temperature 50° C. higher than the softening point of the pitch with a pressure of 16 tons for 20 minutes. After the molding, air cooling was performed.

Subsequently, the secondary particles were heat-treated under an inert atmosphere and then, naturally cooled down to room temperature. Herein, the heat-treatment was performed at 300° C. for 2 hours and then, at 900° C. for 1 hour.

After the cooling, the secondary particles were pulverized with the particle diameter range of 8 μm to 15 μm based on D50 by using a jet mill. After the pulverization, the pulverized product was sieved with a #635 mesh (20 μm) to obtain a final anode active material.

(2) Manufacture of Lithium Secondary Battery Cell (Half-Cell)

The anode active material in the (1), a binder (PAA), and a conductive material (Super P) were mixed in a weight ratio of 75:24:01 of the anode active material:binder:conductive material and added to distilled water and then, uniformly mixed to prepare slurry.

The slurry was uniformly coated on a copper (Cu) current collector, pressed with a roll press, and dried to manufacture an anode. Specifically, a loading amount thereof was 4 $mg/cm^2$ to have electrode density of 1.0 g/cc to 1.2 g/cc.

Lithium metal (Li-metal) was used as a counter electrode, and an electrolyte solution prepared by dissolving 1 mol of $LiPF_6$ in a mixed solvent of ethylene carbonate (EC):dimethyl carbonate (DMC) in a volume ratio of 1:1 was used.

The anode, the lithium metal, and the electrolyte solution were used according to a common manufacturing method to manufacture a CR 2032 half coin cell.

Example A2

(1) Preparation of Anode Active Material

An anode active material was prepared according to the same method as the (1) of Example A1 except that the weight ratio of nano-silicon particles:graphite particles:pitch particles in the mixed powder was changed into 4:2:4.

(2) Manufacture of Lithium Secondary Battery Cell

A lithium secondary battery cell was manufactured in the same manner as in the (2) of Example 1 using the anode active material of (1).

Example A3

(1) Preparation of Anode Active Material

An anode active material was prepared according to the same method as the (1) of Example A1 except that the weight ratio of nano-silicon particles:graphite particles:pitch particles in the mixed powder was changed into 4:3:3.

(2) Manufacture of Lithium Secondary Battery Cell

A lithium secondary battery cell was manufactured in the same manner as in the (2) of Example 1 using the anode active material of (1).

Comparative Example A1

(1) Preparation of Anode Active Material

An anode active material was prepared according to the same method as the (1) of Example A1 except that the weight ratio of nano-silicon particles:graphite particles:pitch particles in the mixed powder was changed into 4:5:1.

(2) Manufacture of Lithium Secondary Battery Cell

A lithium secondary battery cell was manufactured in the same manner as in the (2) of Example 1 using the anode active material of (1).

Comparative Example A2

(1) Preparation of Anode Active Material

An anode active material was prepared according to the same method as the (1) of Example A1 except that the weight ratio of nano-silicon particles:graphite particles:pitch particles in the mixed powder was changed into 4:4:2.

(2) Manufacture of Lithium Secondary Battery Cell

A lithium secondary battery cell was manufactured in the same manner as in the (2) of Example 1 using the anode active material of the (1).

Subsequently, a specific surface area depending on a pitch content in Example A and Comparative Example A was measured, and the results are shown in Tables 1 and 2.

Air permeability, specific surface area, and tap density were measured in the following methods.

TPV (Total Pore Volume), Vt-Plot, Fmicro, APD Measurement Method

A total pore volume (TPV) was calculated as a relative pressure measured at a single point under a relative pressure of 0.95.

A Vt-plot is a volume of micro pores obtained by a t-plot.

Fmicro was calculated as a fraction of Vt-plot and TPV (=V(t-plot)/TPV).

APD (average pore diameter) was calculated by TPV (total pore volume), that is, a correlation equation between surface area and volume, when the pores were assumed to have a cylinder shape.

Measurement of Specific Surface Area

A BET method (a surface area and porosity analyzer, ASAP2020, Micromeritics Instrument Corp.) was used to measure a specific surface area.

Measurement of Tap Density

According to ASTM-B527, 10 g of powder was put in a 50 mL container and 3000 cycles tapped at 284 cycles/min to measure packing density.

Measurement of Carbonization Yield

A carbonization yield was measured by using TG-DTA, and a yield according to a temperature-increasing profile was measured at 900° C. A difference of the carbonization yield depending on a temperature-increasing rate, a step-temperature during the heating, step-holding time, and holding time at the final temperature was examined.

TABLE 1

| | Pitch content (wt %) | BET ($m^2/g$) | TPV ($cm^3/g$) | Vt-plot ($cm^3/g$) | Fmicro (%) | APD (nm) |
|---|---|---|---|---|---|---|
| Comparative Example A1 secondary particle | 10 | 21.9 | 0.044 | 0.0015 | 3.44 | 8.06 |
| Comparative Example A1 primary particle | | 19.43 | 0.038 | 0.0012 | 3.20 | 7.76 |
| Example A1 secondary particle | 50 | 5.8 | 0.006 | 0.0011 | 18.58 | 4.24 |
| Example A1 primary particle | | 11.57 | 0.012 | 0.0016 | 12.52 | 4.29 |

TABLE 2

| | Particle diameter (μm) | | | | | Tap density (g/cc) | Carbonization yield (%) |
|---|---|---|---|---|---|---|---|
| | $D_1$ | $D_{10}$ | $D_{50}$ | $D_{90}$ | $D_{max}$ | | |
| Comparative Example A1 | 2.7 | 5.1 | 11.7 | 20.8 | ≤36.0 | 0.51 | 96.01 |
| Example A1 | 2.2 | 4.2 | 10.7 | 19.3 | ≤36.0 | 0.87 | 86.80 |

Referring to Table 1, pore structures of the primary particles and the secondary particles according to the example and the comparative example were identified.

Specifically, in the comparative example including more graphite than pitch, the specific surface area tended to rather increase after manufacturing the secondary particles.

The reason is that when the pitch was more included according to a composition ratio, plasticity increased, but when the graphite was dominantly present, elasticity predominantly worked, providing a restoring force against pressure during the compression and thus increased the specific surface area.

Surely, the graphite is expected to show different particle contact behaviors depending on a particle size due to during the compression, but a relative content of the pitch turned out to be dominantly important to secure a high-density compression structure.

Table 2 shows carbonization yield, tap density, and the like of the anode active materials according to the example and the comparative example.

As shown in Table 2, the larger the pitch content, the smaller the carbonization yield, but the larger the tap density.

This is contrary to the result shown in FIG. 1 showing that the larger the pitch content, the smaller the specific surface area, which will be described later.

In addition, this is also shown in FIG. 1.

FIG. 1 is a graph showing a correlation between the pitch content and the specific surface area (BET).

Composite spheres defined as the primary particles and the secondary particles (after the press) manufactured by molding exhibited that the specific surfaces overall tended to decrease, as the pitch was increased.

However, when the decrease tendency and changes before and after the press were examined, the primary particles exhibited a tendency to decrease in the specific surface area at greater than or equal to 30% of the pitch input amount, but the secondary particles exhibited a tendency to linearly decrease in the specific surface area, as the pitch amount was increased.

Specifically, when the pitch amount was small, but the graphite amount was large (Comparative Example 1), the primary particles exhibited a tendency to rather increase in the specific surface area after the press. However, when the pitch weight was 30% or more, the specific surface area was remarkably reduced after the press.

As aforementioned, when the pitch amount was large, plasticity increased. Specifically, when the graphite was dominantly present, the specific surface area was increased due to the phenomenon that elasticity predominantly acts and works as a restoring force against the pressure during the compression. Accordingly, in order to secure the high density compress structure, when the pitch content was equal to or larger than that of the graphite particles, the specific surface area-reducing effect turned out to be dominant.

Figure 2:
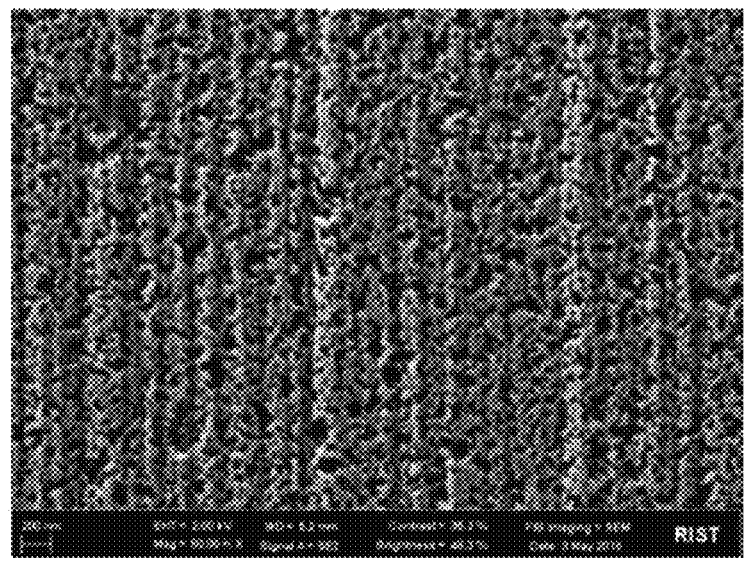
FIG. 2 shows internal cross-sectional structures of primary particles according to Comparative Example A1 and Example A1.
Figure 2:
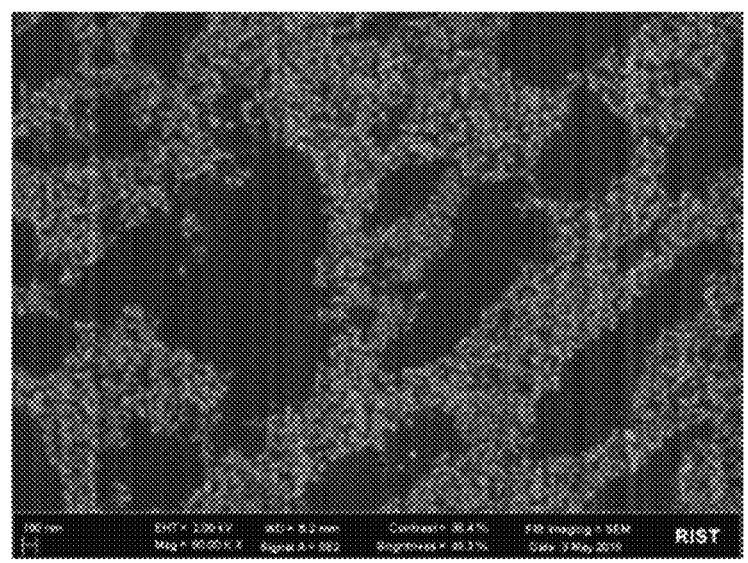

FIG. 2 shows an internal cross-section structure of the primary particles according to Comparative Example A1 and Example A1.

As shown in FIG. 2, Comparative Example A1 in which the graphite was predominantly present had no relatively complete bond among the components but exhibited a lot of spaces such as pores (voids).

However, as the pitch content was increased, the specific surface area, which is a space between the particles, tended to decrease.

Specifically, as shown in Example A1 of FIG. 2, when 50 wt % of the pitch was input, a region where the pitch distinguished from the graphite was agglomerated increased In other words, in order to secure uniform dispersity and increase contact property between the particles based on a cross-section structure of the porous silicon-carbon composite, it is important to derive an optimumal ratio of the composition.

Figure 5:
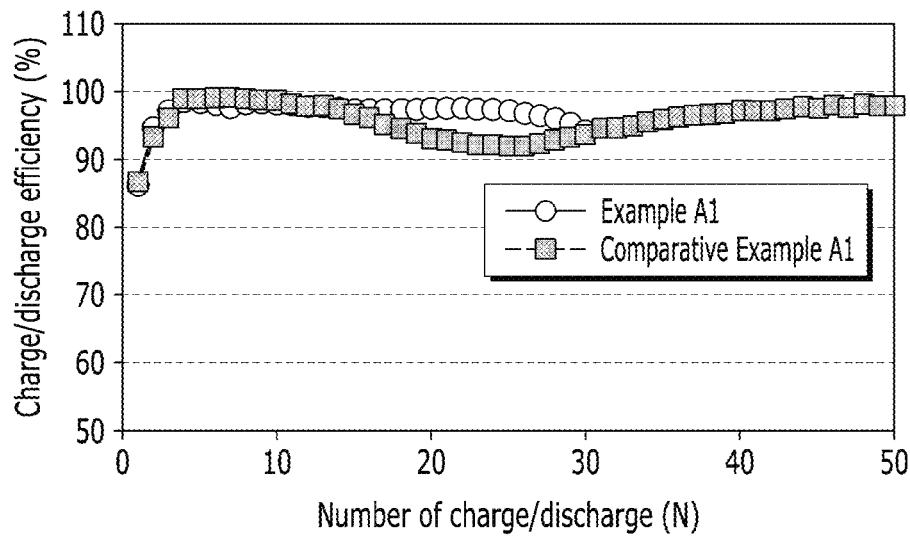
FIG. 5 shows coulombic efficiency (a) and capacity retention (b) results according to the number of charges and discharges of lithium secondary battery cells of Example A1 and Comparative Example A1.
Figure 5:
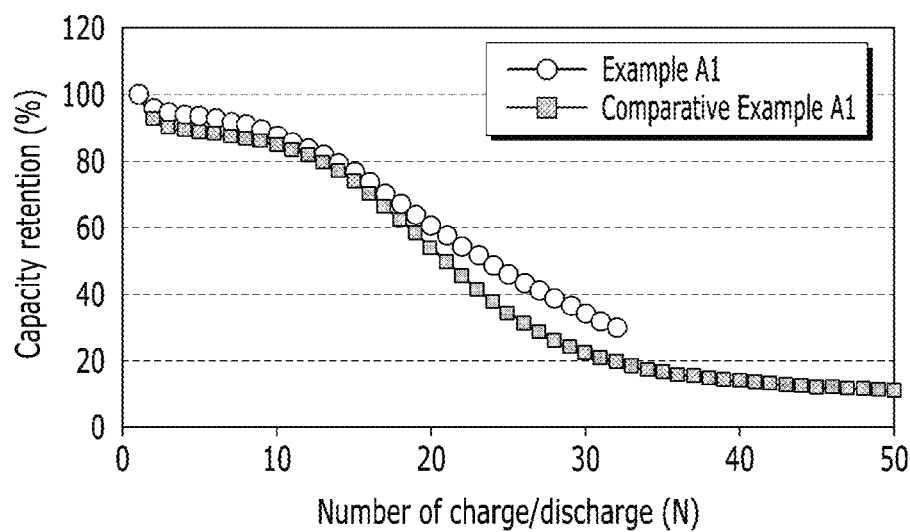

FIG. 5 shows coulombic efficiency (a) and capacity retention (b) results of the lithium secondary battery cells according to Example A1 and Comparative Example A1 depending on the number of charge and discharge.

Methods of measuring the coulombic efficiency and the capacity retention depending on the number of charge and discharge are as follows.

Measurement of Coulombic Efficiency and Capacity Retention

Each final active material obtained in the examples and the comparative examples was applied to a half-cell and evaluated.

Figure 6:
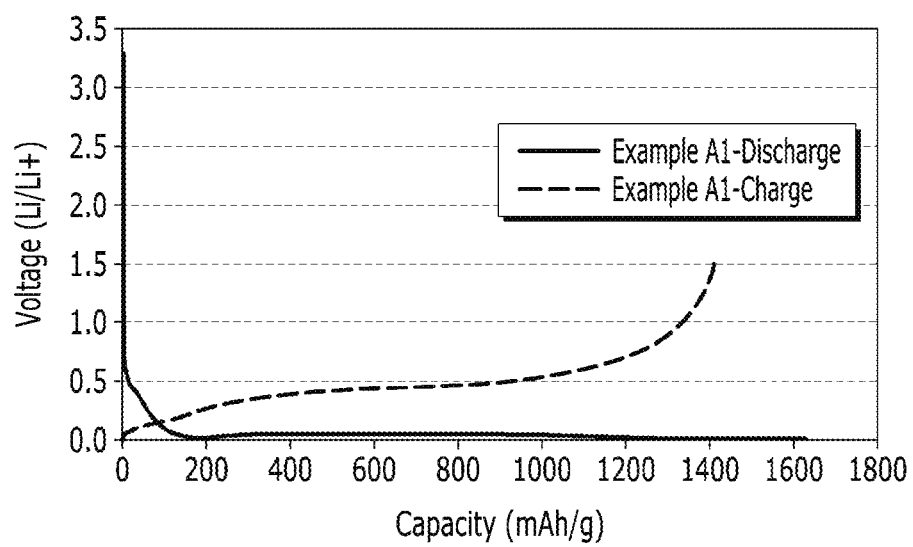
FIG. 6 shows charge and discharge curves of the lithium secondary battery cells of Example A1 (a) and Comparative Example A1 (b) at the $1^{st}$ cycle.
Figure 6:
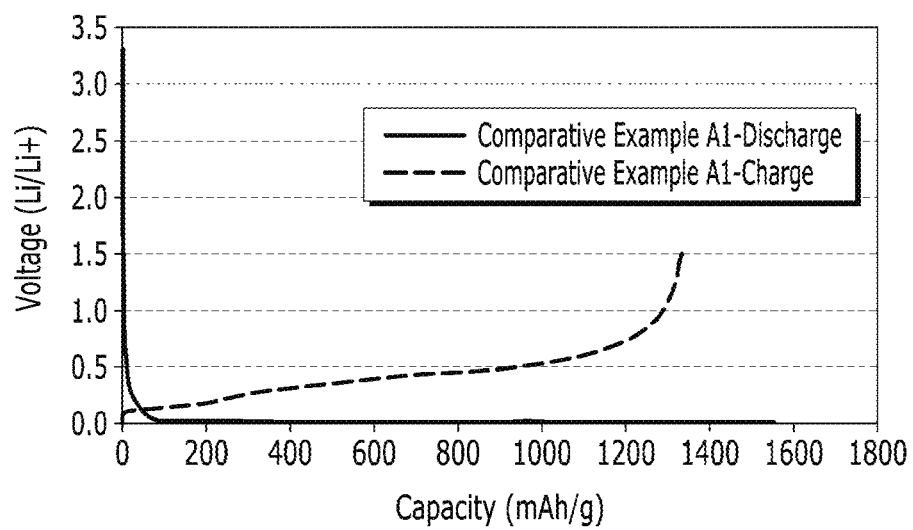

Specifically, the cells were operated under charge conditions of 0.5 C, 0.005 V, and 0.005 C cut-off and discharge conditions of 0.5 C and 1.5 V cut-off, and the coulombic efficiency and capacity retention thereof were measured and shown in FIG. 6.

Specifically, FIG. 5 is a graph showing electrochemical property changes of the lithium secondary battery cells according to an input amount of the pitch. More specifically, as shown in (a) of FIG. 5, Comparative Example A1 including a small pitch amount of 10 wt % exhibited sharply decreased efficiency within a 20th to 30th charge and discharge section, compared with Example A1.

As described above, when the pitch content was too small, the number of points where an electrical contact path was disconnected due to expansion and contraction was increased, rapidly deteriorating efficiency.

Such a phenomenon that the electrical contact path was disconnected also was confirmed through (b) of FIG. 5. Specifically, as shown in the (b) of FIG. 5, in Comparative Example A1, as the number of points where the electrical contact path is disconnected is increased in a section of 20 to 30 charges/discharges, capacity retention also sharply decreased.

FIG. 6 shows charge and discharge curves at the $1^{st}$ cycle of the lithium secondary battery cells according to Example A1(a) and Comparative Example A1 (b).

As shown in FIG. 6, Example A1 exhibited initial efficiency of 86.5%, while Comparative Example A1 exhibited initial efficiency of 86.3%, which exhibited a similar tendency but had a different slope of initial discharge profile, and accordingly, a composite material including more graphite exhibited larger resistance during the discharge.

This is also due to a pitch content difference in Example A1(a) and Comparative Example A1 (b).

Example B: Comparison of Characteristics According to Conditions of Heat-Treatment of Secondary Particles Example B1

(1) Preparation of Anode Active Material

Compared with the (1) of Example A1, the weight ratio of the nano-silicon particles:graphite particles:pitch particles of the mixed powder was changed into 3:3:4. Herein, the pitch was coal-based pitch, and a softening point of the pitch was 250° C.

Subsequently, an anode active material was prepared according to the same method as the (1) of Example A1 except that the first isothermal process was performed by increasing the temperature up to 600° C. at 5° C./min and maintaining it for 1 hour, and the second isothermal process was performed by increasing the temperature up to 900° C. at 5° C./min and maintaining it for 1 hour in the heat-treatment of the secondary particles.

(2) Manufacture of Lithium Secondary Battery Cell

A lithium secondary battery cell was manufactured in the same manner as in the (2) of Example 1 using the anode active material of (1).

Example B2

(1) Preparation of Anode Active Material

Compared with the (1) of Example B1, the pitch was coal-based pitch, and a softening point of the pitch was 250° C.

Subsequently, an anode active material was prepared according to the same method as above except that the first isothermal process was performed by increasing a temperature up to 400° C. at 5° C./min and then, maintaining it for 2 hours, and the second isothermal process was performed by increasing up to 900° C. at 5° C./min and maintaining it for 1 hour in the heat-treatment of the secondary particles.

(2) Manufacture of Lithium Secondary Battery Cell

A lithium secondary battery cell was manufactured in the same manner as in the (2) of Example 1 using the anode active material of (1).

Comparative Example B1

(1) Preparation of Anode Active Material

An anode active material was prepared according to the same method as the (1) of Example B1 except that the first isothermal process was performed by increasing a temperature up to 600° C. at 10° C./min and maintaining it for 2 hours, and the second isothermal process was performed by increasing the temperature up to 900° C. at 10° C./min and maintaining it for 1 hour in the heat-treatment of the secondary particles.

(2) Manufacture of Lithium Secondary Battery Cell

A lithium secondary battery cell was manufactured in the same manner as in the (2) of Example 1 using the anode active material of (1).

Comparative Example B2

(1) Preparation of Anode Active Material

An anode active material was prepared according to the same method as the (1) of Example B1 except that the first isothermal process was performed by increasing a temperature up to 400° C. at 10° C./min and maintaining it for 1 hour, and the second isothermal process was performed by increasing the temperature up to 900° C. at 10° C./min and maintaining it for 1 hour in the heat-treatment of the secondary particles.

(2) Manufacture of Lithium Secondary Battery Cell

A lithium secondary battery cell was manufactured in the same manner as in the (2) of Example 1 using the anode active material of (1).

Comparative Example B3

(1) Preparation of Anode Active Material

An anode active material was prepared according to the same method as the (1) of Example B1 except that the heat-treatment of the secondary particles was performed by increasing a temperature up to 900° C. at 10° C./min without the isothermal processes.

(2) Manufacture of Lithium Secondary Battery Cell

A lithium secondary battery cell was manufactured in the same manner as in the (2) of Example 1 using the anode active material of (1).

Subsequently, carbonization yields of Examples B1 to B3 and Comparative Examples B1 to B2 were measured, and the results are shown in Table 3.

Specific surface areas of the anode active materials were measured in the same method as above, and the carbonization yields were measured in the following method.

TABLE 3

| | Specific surface area (BET) (m²/g) | Carbonization yield (@900° C.) (%) |
|---|---|---|
| Example B1 | 9.9 | 86.2 |
| Example B2 | 10.22 | 94.4 |
| Comparative Example B1 | 9.1 | 64.2 |
| Comparative Example B2 | 9.39 | 90.3 |
| Comparative Example B3 | 10.24 | 57.5 |

Figure 3:
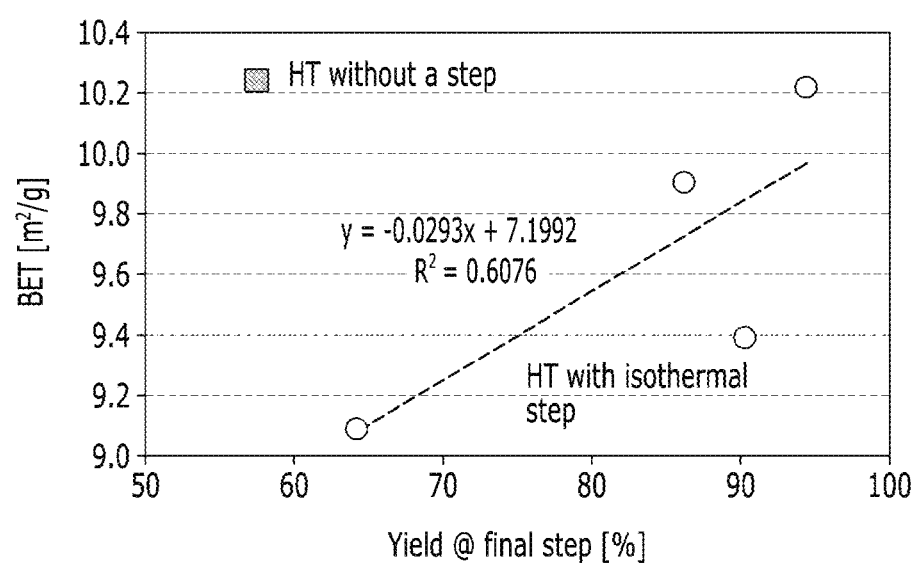
FIG. 3 is a graph showing specific surface area changes according to heat-treatment conditions of secondary particles in Examples B1 to B3 and Comparative Examples B1 to B2.

Specifically, the specific surface areas of the anode active materials according to Examples B1 to B2 and Comparative Examples B1 to B3 were measured, and the results are shown in Table 3 and FIG. 3.

FIG. 3 is a graph showing specific surface area changes of the secondary particles according to Examples B1 to B2 and Comparative Examples B1 to B3 according to conditions of the heat-treatment.

As shown in Table 3 and FIG. 3, Comparative Example B3 in which the heat-treatment was performed up to 700° C. without the isothermal processes exhibited a high specific surface area and a very low carbonization yield. On the other hand, when the isothermal processes were performed as in the examples, a low specific surface area and an excellent carbonization yield were obtained.

Accordingly, the examples in which the isothermal processes were performed to pyrolyze the pitch as slowly as possible around the softening point exhibited a clear tendency difference from a sample (Comparative Example B3) linearly heated up to a target temperature at a constant rate.

On the other hand, even when the isothermal processes were performed, different results were obtained depending on a temperature and a rate.

Specifically, the slower the heating rate up to a temperature around the softening point of the pitch, the better the carbonization yield. More specifically, the carbonization yields of Examples B1 and B2 in which the first isothermal process was performed at 5° C./min were higher than those of Comparative Examples B1 and B2.

The carbonization yield of Comparative Example B2 in which the temperature of the first isothermal process was maintained around the softening point among Comparative Examples B1 and B2 having a fast heating rate was more excellent. Specifically, under the same heating rate condition, when low molecular weight volatiles decomposable during the heat-treatment were removed for a long time, a higher yield was obtained.

In other words, a final carbonization yield of the anode active material turned out to be closely related to conditions of the heat-treatment of the secondary particles.

Example C: Comparison of Characteristics According to Amount of Carbon Deposited on Surface of the Si—C Composite Example C1

(1) Preparation of Anode Active Material

The anode active material according to the (1) of Example A1 was put in a horizontal furnace, and 200 sccm of argon (Ar) gas and 400 sccm of CH₄ were injected thereinto at 760° C. for 1 hour to conduct a CVD deposition experiment. The above two processes provided a deposition amount of about 2%. Accordingly, an anode active material was prepared according to the same method as the (1) of Example A1 except that a carbon component was deposited on the surface thereof.

(2) Manufacture of Lithium Secondary Battery Cell

A lithium secondary battery cell was manufactured in the same manner as in the (2) of Example A1 using the anode active material of the (1).

Example C2

(1) Preparation of Anode Active Material

The anode active material according to the (1) of Example A1 was put in a horizontal furnace, and 200 sccm of argon (Ar) gas and 400 sccm of CH₄ were injected thereinto at 1,000° C. for 1 hour to conduct the CVD deposition experiment. The above two processes provided a deposition amount of about 7%. Accordingly, an anode active material was prepared according to the same method as the (1) of Example A1 except that a carbon component was deposited on the surface thereof the anode active material.

Comparative Example C1

(1) Preparation of Anode Active Material

The anode active material according to the (1) of Comparative Example A1 was put in a horizontal furnace, and 200 sccm of argon (Ar) gas and 400 sccm of CH₄ were injected thereinto at 760° C. for 1 hour to conduct the CVD deposition experiment. The above processes provided a deposition amount of about 7%. Accordingly, an anode active material was prepared according to the same method as the (1) of Example A1 except that a carbon component was deposited on the surface thereof.

(2) Manufacture of Lithium Secondary Battery Cell

A lithium secondary battery cell was manufactured in the same manner as in the (2) of Example C1 using the anode active material of (1).

Figure 7:
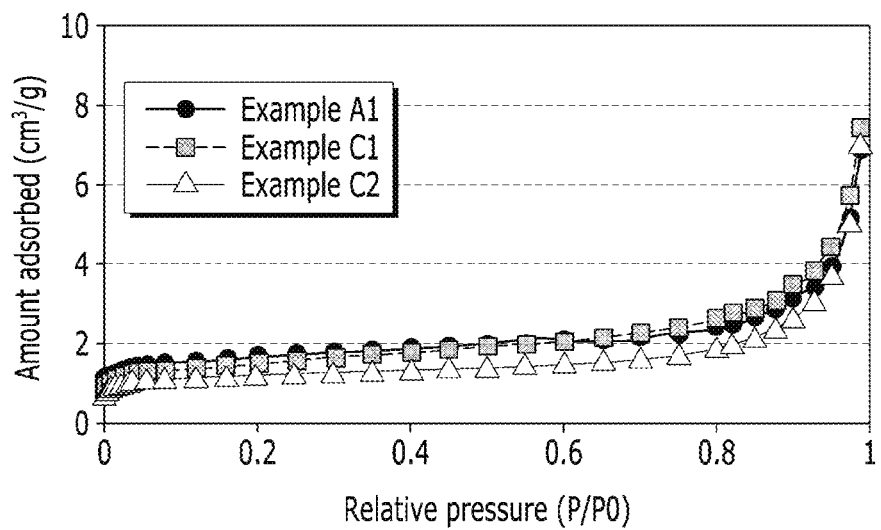
FIG. 7 shows adsorption and desorption curves (a) of the lithium secondary battery cells of Examples C1 to C2 and Comparative Example C1 and pore distribution curves (b) thereof, which are examined in a DFT method.
Figure 7:
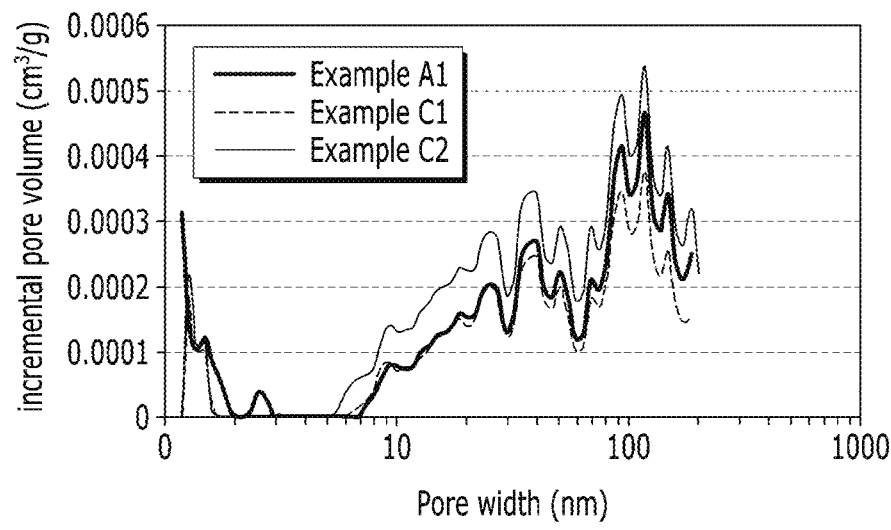

Specific surface areas and pores of the lithium secondary battery cells according to the example and the comparative example were measured, and the results are shown in Table 4 and FIG. 7.

TABLE 4

| BET change according to CVD loading amount (m²/g) | | |
|---|---|---|
| No treatment | CVD-2% | CVD-7% |
| 21.9 (Comparative Example A1) | 20.45 (Comparative Example C1) | — |
| 5.8 (Example A1) | 5.29 (Example C1) | 4.11 (Example C2) |

As shown in Table 4, Examples C1 and C2 and Comparative Example C1 in which an amorphous carbon layer was further formed by introducing CH₄ gas exhibited changes of the specific surface areas and pores.

The characteristics are also shown in FIG. 7.

FIG. 7 shows adsorption and desorption curves (a) and pore distribution curves (b), which are examined in the DFT method, of the lithium secondary battery cells according to Examples C1 to C2 and Comparative Example C1.

In other words, as shown in Table 4 and FIG. 7, the deposition amount of the carbon layer was changed depending on a temperature in the CVD deposition process. Specifically, when the deposition experiment was conducted at 760° C., the deposition amount was 2%, and when at 1000°

C., the deposition amount was 7%. Accordingly, it is important to set an appropriate temperature section for the CVD deposition.

Specifically, the specific surface area examined in the BET method decreased, as the deposition amount was increased. This is because external pores and defect structures were coated and filled during the CVD deposition.

In addition, as shown in FIG. 7, when pore structure changes were examined in the DFT method, as the deposition amount was increased, micropores of less than or equal to 2 nm significantly decreased, but at the deposition amount of 2%, pores in a meso region slightly decreased but increased again at the deposition amount of 7%.

Accordingly, as pores of the micro regions were more present, a BET value easily increased, and accordingly, the CVD deposition was effective in reducing the BET value.

Experimental Example: Comparison of Co-Carbonization Characteristics of Powders According to Mixing of Petroleum-Based Pitch and Coal-Based Pitch Specifically, the following experimental examples were disclosed to examine a co-carbonization behavior according to a heat-treatment by preparing powder with pitch alone. In other words, as shown in Table 5, the powder was prepared by using one type of pitch or a mixture of the pitch and then, examined with respect to a weight change by using TG/DTA.

Measurement of Yield Change

In Table 5 below, a yield change means a yield change according to holding time at a final target temperature of 900° C. Specifically, each different yield change was obtained according to an isothermal treatment at 900° C. and a pitch composition.

TABLE 5

| | Petroleum-based pitch content (wt %) | Pitch mixing ratio (coal-based:petro-leum-based) | Final carbonization yield (wt %) | Yield change @900° C. |
|---|---|---|---|---|
| Experimental Example 1 | 0 | 100:0 | 75.41 | 2.72 |
| Experimental Example 2 | 10 | 90:10 | 78.07 | 1.85 |
| Experimental Example 3 | 20 | 80:20 | 79.79 | 2.30 |
| Experimental Example 4 | 30 | 70:30 | 79.65 | 2.83 |
| Experimental Example 5 | 40 | 60:40 | 79.99 | 2.76 |
| Experimental Example 6 | 50 | 50:50 | 79.20 | 3.30 |
| Comparative Experimental Example 1 | 100 | 0:100 | 67.55 | 2.13 |

As shown in Table 5, when petroleum-based pitch or coal-based pitch alone was used, a final carbonization yield was higher, compared with when the petroleum-based pitch or the coal-based pitch was used as a mixture.

In addition, even though the pitch alone was used, when the coal-based pitch alone was used, a final yield was similar to that of another example embodiment, but Comparative Example C1 of using the petroleum-based pitch alone exhibited a lower final yield.

Figure 4:
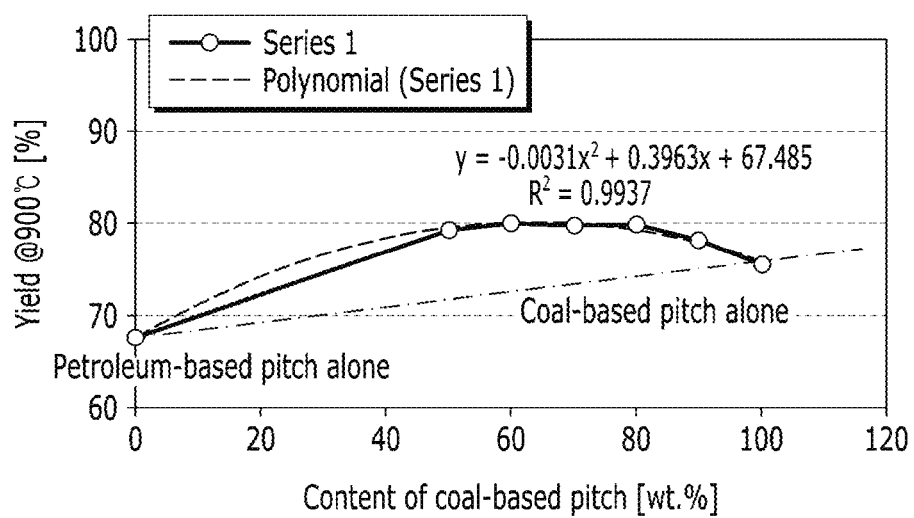
FIG. 4 is a graph showing a carbonization yield after the heat-treatment according to a content increase of coal-based pitch.

This is also confirmed through FIG. 4.

FIG. 4 is a graph showing a carbonization yield after the heat-treatment according to a content increase of the coal-based pitch.

Specifically, as shown in FIG. 4 and Table 5, compared with when the pitch was used alone, a better carbonization yield brought about a smaller specific surface area, when used as a mixture. Accordingly, a yield-improving effect due to the co-carbonization of the coal-based pitch and the petroleum-based pitch was confirmed.

In addition, as shown in FIG. 4, in a fraction of 50% or more of the coal-based pitch, the carbonization yield was in good agreement with a quadratic trend line, exhibiting a fitness level of R2=0.9937. This indicates a degree of agreement with a theoretical quadratic trend line, and the closer to 1, the more consistent with the theoretical trend.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

The invention claimed is:

1. A method of preparing an anode active material for a lithium secondary battery, comprising:
   preparing a porous silicon-carbon mixed powder by mixing nano-silicon particles, graphite particles, and pitch particles by dry milling;
   adding the porous silicon-carbon mixed powder and a binder to distilled water to prepare a mixed solution;
   spray-drying the mixed solution to prepare primary particles;
   inserting the primary particles into a mold and press-molding to produce secondary particles;
   heat-treating the secondary particles to produce heat-treated secondary particles; and
   pulverizing and sieving the heat-treated secondary particles,
   wherein, in the preparing of the porous silicon-carbon mixed powder, the pitch particles are included in an amount of greater than or equal to 30 wt % based on 100 wt % of the porous silicon-carbon mixed powder.

2. The method of claim 1, wherein
   in the preparing of the porous silicon-carbon mixed powder by mixing the nano-silicon particles, graphite particles, and pitch particles by dry milling,
   a weight of the pitch particles is greater than or equal to a weight of the graphite particles.

3. The method of claim 2, wherein
   in the preparing of the porous silicon-carbon mixed powder by mixing the nano-silicon particles, graphite particles, and pitch particles by dry milling,
   a weight ratio of the pitch particles and the graphite particles is 1:1 to 5:1.

4. The method of claim 1, wherein
   the pitch particles include a combination of coal-based pitch and petroleum-based pitch, and
   a weight of the coal-based pitch is greater than or equal to a weight of the petroleum- based pitch.

5. The method of claim 4, wherein a weight ratio of the coal-based pitch: the petroleum-based pitch is in a range of 5:5 to 9:1 based on 100 wt % of the pitch particles.

6. The method of claim 1, wherein a softening point of the pitch particles is greater than or equal to 250° C.

7. The method of claim 6, wherein
the heat-treating of the secondary particles comprises:
a first isothermal process in which the secondary particles are heated up to a temperature of 50° C. to 350° C. higher than the softening point of the pitch particles and maintained at a rate of less than or equal to 7° C./min; and
a second isothermal process in which after the first isothermal process, the secondary particles are heated up to a temperature range of 700° C. to 1000° C. at a rate of less than or equal to 7° C./min and then maintained.

8. The method of claim 7, wherein the first isothermal process and the second isothermal process are maintained for 1 hour to 4 hours.

9. The method of claim 1, wherein
after the pulverizing and sieving of the heat-treated secondary particles,
forming a carbon coating layer on a surface of the secondary particles is further included, and
the forming of the carbon coating layer is performed at 750° C. to 1,000° C.

10. The method of claim 1, wherein
after the heat-treating of the secondary particles,
a carbonization yield of the secondary particles is 60% to 95%.

11. The method of claim 1, wherein
by the heat-treating of the secondary particles,
the pitch particles are carbonized into soft carbon, and
the binder is carbonized into hard carbon.

* * * * *

UNITED STATES PATENT AND TRADEMARK OFFICE
CERTIFICATE OF CORRECTION

| | | |
|---|---|---|
| PATENT NO. | : 12,438,144 B2 | Page 1 of 1 |
| APPLICATION NO. | : 17/298404 | |
| DATED | : October 7, 2025 | |
| INVENTOR(S) | : Kim et al. | |

It is certified that error appears in the above-identified patent and that said Letters Patent is hereby corrected as shown below:

On the Title Page

Item [73], should read:
POSCO Holdings., Seoul (KR) and
RESEARCH INSTITUTE OF INDUSTRIAL SCIENCE & TECHNOLOGY,
Pohang-si (KR)

Signed and Sealed this
Tenth Day of February, 2026

John A. Squires
*Director of the United States Patent and Trademark Office*